May 4, 1937.  W. L. WETTLAUFER  2,079,235
ANTISKID DEVICE
Filed Jan. 2, 1936
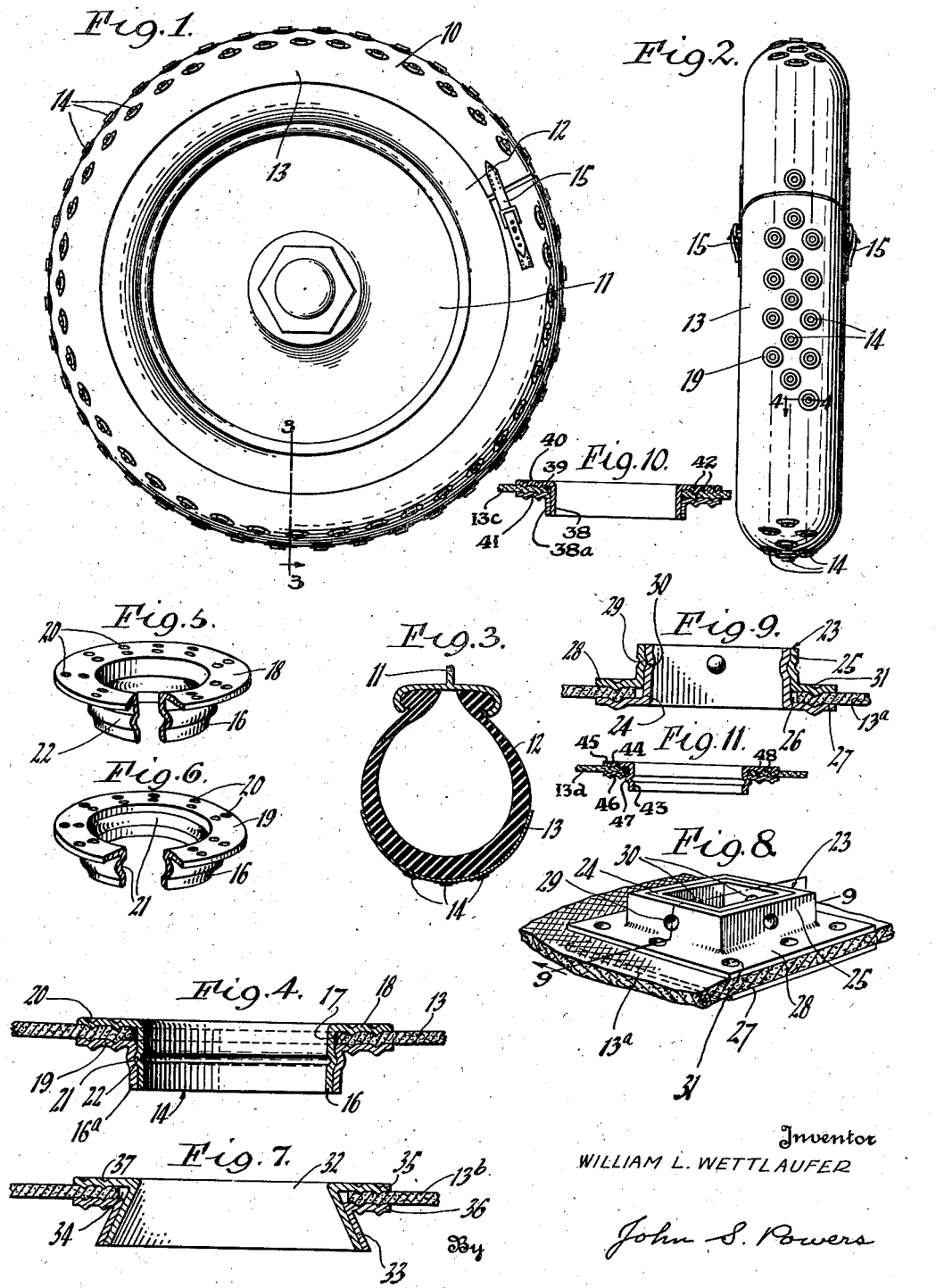
Inventor
WILLIAM L. WETTLAUFER
By John S. Powers
Attorney Patented May 4, 1937

2,079,235

UNITED STATES PATENT OFFICE 2,079,235

ANTISKID DEVICE

William L. Wettlaufer, Buffalo, N. Y.

Application January 2, 1936, Serial No. 57,139

7 Claims. (Cl. 152—14)

This invention relates to improvements in antiskid devices for vehicle wheels, and especially those utilizing tires, and more particularly the invention is concerned with devices of the kind wherein the traction providing elements are carried by a flexible body which may be removably secured upon a tire, it being understood that the said body may cover either the entire tread area of the tire or only a portion thereof.

One object of the invention is to provide a device of the character generally described having traction providing elements which offer resistance to skidding in all directions without injury to the surface which is engaged.

A further object is a device in which provision is made for preventing the traction providing elements from wearing the tire of the wheel upon which the device is secured, this object contemplating the use of elements having heads of substantial areas which fit conformably against the tire.

A still further object is to provide for facility in assembling the parts of the device and in replacing the traction providing elements.

A still further object is a traction providing element of novel design whereby simplicity and economy in design are obtained and a light construction is insured.

The invention is illustrated in the accompanying drawing in which:

Figure 1 is a side elevation of a vehicle wheel showing applied thereto a device in which the features of the invention are incorporated.

Figure 2 is a front elevation of the wheel.

Figure 3 is an enlarged section taken along line 3—3 of Figure 1.

Figure 4 is an enlarged section through one of the traction providing elements and is taken along line 4—4 of Figure 2.

Figure 5 is an enlarged perspective view of one part of one of the traction providing elements.

Figure 6 is a similar view of the companion part of the said element.

Figure 7 is a view similar to Figure 4 and illustrates a modified form of element.

Figure 8 is a perspective view illustrating a multi-sided type of element.

Figure 9 is a section through the latter element and is taken along line 9—9 of Figure 8.

Figures 10 and 11 are sectional views of other modifications of the traction providing element.

The device, which is indicated generally at 10 and which is illustrated by way of example in connection with a conventional automobile wheel 11, is applied to the tire 12 of the wheel. It includes a body 13 which fits upon the tire in the manner of a casing and which carries traction providing elements 14, the said elements being arranged in three series with the elements of each series being staggered in relation to the elements of adjacent series.

The body 13, as illustrated, is in the form of a strip which is applied to the tire so as to completely encase the tread thereof, the ends of the said strip being drawn together by suitable strap fastenings 15 to secure the casing which is thus provided to the tire and hold it against movement on the tire. It is to be understood, of course, that the body 13 may be of canvas or any other suitable material and that it may, if preferred, be designed to cover only a portion of the tread area of the tire.

In accordance with the invention the elements 14 (Figure 4) are provided by inner and outer rings 16 and 16a, respectively, the inner ring projecting through an opening 17 in the body 13 and having a flanged head 18. One side of the said head engages the inner side of the body 13, the other side of the head fitting conformably against the tire. The outer ring 16a fits over the ring 16 and is formed with a flanged head 19 which engages the outer side of the body 13. The flanged heads of the rings engage between them the material surrounding the opening 17 to secure the element to the body 13, indentations 20 preferably being formed in the flanges to embed portions of the metal in the body. The rings 16 and 16a, as illustrated, are tapered slightly from their flanges toward their surface engaging ends, the diameters of the rings being such that as they are assembled and the flanged heads engage the body 13 in the manner described, the outer ring 16a is wedged tightly upon the inner ring 16. In order to lock the rings against separation the outer ring 16a is preferably formed with an internal annular recess 21 while the inner ring 16 is formed with an external annular rib 22 which fits in the said recess. The rib and recess are preferably preformed, whereby as the rings are assembled the former enters the latter to lock the rings together, it being understood that the rings are formed of a suitable spring metal to permit the parts to be assembled in the manner described. It will be apparent from the foregoing that as the rib 22 enters the recess 21 and the flanges 18 and 19 are pressed against the body 13 the tapered inner wall of the ring 16a is forced tightly upon the tapered outer wall of the ring 16 to wedge the two rings together, the rib 22 cooperating with the recess 21 to lock the parts in this relation. The rings will remain locked together until so much of them wears away that the locking joint provided by the rib 22 and the recess 21 is destroyed, the outer ring slipping off the inner ring when this occurs. Upon destruction of the locking joint in the manner described the inner ring can be readily removed from the opening 17 and the worn out element replaced by a new one.

The outer ends of the rings 16 and 16a provide the surface engaging portions of the elements. Wearing away of these portions of the elements is held to a minimum and injury to the engaged surfaces is prevented as a result of the relatively large contact areas provided by the co-operating walls of the rings, it being understood that the surface engaging portions of the elements may be curved, if desired, to follow the curvature of the tire. It will be noted further that the flanged heads of the elements provide relatively large areas for contact with the tire. The device, therefore, has the added advantage that wearing of the tire by the elements is avoided.

The rings 16 and 16a of the traction providing element illustrated in Figure 4 are of a substantially circular shape. It is to be understood, however, that the shape shown is by way of illustration only and that such shape may be varied. For example, the element which is indicated generally at 23 in Figures 8 and 9 includes inner and outer parts 24 and 25, respectively, which although generally tubular in cross section, include four side walls of substantially equal length. The inner part extends through an opening 26 which is formed in the body 13a and is formed with a flange 27 which engages the material surrounding the opening at the inner side of the body, the outer part 25 being formed with a co-operating flange 28 which engages the material surrounding the opening 26 at the outer side of the body. The opposite walls of the parts 24 and 25 are tapered slightly toward their surface engaging ends so that as the said parts are forced together during the assembling operations the flanges 27 and 28 engage the material between them and the side walls of part 25 are wedged tightly upon the side walls of the part 24. The parts are locked in this relation by projections 29 which are formed in the side walls of the outer part 25 and which enter depressions 30 which are formed in the side walls of the inner part 24, it being understood that when, as in this case, the element is multi-sided it may be secured to the body 13a so that it bears any desired relation with respect to the path through which it is to move when in use. Portions of the flange 28 may, if desired, be embedded in the body 13a by indenting the metal as indicated at 31. It will be apparent that the parts 24 and 25 will remain locked together until they wear away to such an extent as to destroy the locking joint provided by the projections 29 and the depressions 30. When this occurs the element may be replaced as described.

The modified form of element illustrated in Figure 7 includes inner and outer parts 32 and 33, respectively, the inner part extending through an opening 34 in the body 13b and being formed with a flange 35 which engages the material surrounding the opening 34 at the inner side of the said body. The outer part 33 is formed with a co-operating flange 36 which engages the material surrounding the opening 34 at the outer side of the body 13b. The parts 32 and 33 are originally of uniform, or tubular, cross-section so that in the assembly of an element the outer part 33 can be slipped over the inner part 32, whereby to engage the material surrounding the opening 34 between the flanges 35 and 36. While the parts are held in this position the side walls are deformed so that they flare slightly in the direction of their surface engaging ends, it being understood that the parts are formed of a metal which will insure their retaining such shape. When the parts are deformed as described the outer part 33 is locked permanently upon the inner part 32, suitable indentations 37 preferably being formed in the flanges 35 and 36 to embed portions of the metal in the body 13b and thereby prevent movement of the locked parts relative to the said body.

Other modified forms of the traction providing element are illustrated in Figures 10 and 11. The element shown in the former includes inner and outer rings 38 and 38a, respectively, the inner ring extending through an opening 39 in the body 13c and being formed with a flange 40. One side of the flange engages the material surrounding the opening 39 at the inner side of the body while the opposite side of the flange is adapted to fit conformably against the tire of the wheel upon which the device is secured. The outer ring is formed with a co-operating flange 41 which engages the material surrounding the opening 39 at the outer side of the body 13c, the flanges 40 and 41 being suitably indented as at 42 to embed portions of the metal in the said body. The rings 38 and 38a are tubular in shape and are of a uniform cross section throughout their lengths, the outer diameter of the inner ring originally being just slightly greater than the inner diameter of the outer ring. In the assembly of the element the outer ring is forced over the inner ring until the material surrounding the opening 39 is engaged between the flanges 40 and 41. The parts, therefore, are secured against separation without the aid of auxiliary locking means.

The embodiment shown in Figure 11 includes a single ring 43 which extends through an opening 44 in the body 13d. The said ring is formed with a flange 45, one side of the flange engaging the material surrounding the opening 44 at the inner side of the body 13d while the opposite side of the flange is adapted to fit conformably against the tire of the wheel upon which the device is secured. A washer 46 fits over the ring 43 and co-operates with the flange 45 thereof to secure the element to the body 13d, the said washer being secured against the material surrounding the opening 44 by an annular rib 47 which is formed upon the ring. The flange and washer 45 and 46, respectively, are indented as indicated at 48 to embed portions of the flange in the body and thereby secure the element against movement with respect to the body.

From the foregoing it will be apparent that the device illustrated in the various embodiments is light in weight and is of a simple and inexpensive construction. The large areas of contact between the traction providing elements and the tire not only prevent wearing of the tire by the said elements but also aid in holding the device against slipping from the position in which it is secured. A further advantage obtained is that the traction providing elements are independent of one another and can be readily replaced when they become worn or otherwise unsuitable for further use.

I claim as my invention:

1. A traction providing element for an antiskid device having a flexible body, said element including companion parts which engage opposite sides of said body to secure said element to it and which co-operate to provide a composite wall with each of said parts being adapted to contact the surface engaged by said element, said parts being deformed to provide a locking joint which secures them against separation.

2. A traction providing element for an anti-skid device having a flexible body, said element including companion parts, said parts being flanged at one end to engage opposite sides of said body to secure said element to it and having sides which co-operate to provide a composite wall with the side of each of said parts being adapted to contact with the surface engaged by said element, said parts being deformed to provide a locking joint which secures them against separation.

3. A traction providing element for an anti-skid device having a flexible body, said element including companion parts which are generally tubular in cross section, said parts having flanged heads which engage opposite sides of said body to secure said element to it and having tapered sides which engage one another tightly and which co-operate to provide a composite wall with the side of each of said parts being adapted to contact with the surface engaged by said element, and means for securing said parts against separation.

4. A traction providing element for an anti-skid device having a flexible body, said element including companion parts which are generally tubular in cross section, said parts having flanged heads which engage opposite sides of said body to secure said element to it and having substantially conterminous tapered sides which engage one another tightly and which co-operate to provide a composite wall with the side of each of said parts being adapted to contact with the surface engaged by said element, said sides being deformed to secure said parts against separation.

5. A traction providing element for an anti-skid device having a flexible body, said element including companion rings having flanged heads which engage opposite sides of said body to secure said element to it and having substantially conterminous tapered sides which engage one another tightly and which co-operate to provide a composite wall with the side of each of said rings being adapted to contact with the surface engaged by said element, said sides being deformed to secure said parts against separation.

6. A traction providing element for an anti-skid device having a flexible body, said element including companion rings having flanged heads which engage opposite sides of said body to secure said element to it and having substantially conterminous tapered sides which engage one another tightly and which co-operate to provide a composite wall with the side of each of said rings being adapted to contact with the surface engaged by said element, said sides being formed to provide a recess and a rib which co-operate to lock said parts together.

7. A traction providing element for an anti-skid device having a flexible body, said element including larger and smaller companion parts which are generally tubular in cross section, the larger of said parts being forced over the smaller companion part, whereby to cause the contacting portions of the said parts to lock together, said parts having flanged heads which engage the opposite sides of said body to secure the element to it as said parts are forced together in the manner described, the contacting portions of said parts providing a composite wall with each of said companion parts being adapted to contact with the surface engaged by said element to offer resistance to skidding in all directions.

WILLIAM L. WETTLAUFER.